UNITED STATES PATENT OFFICE.

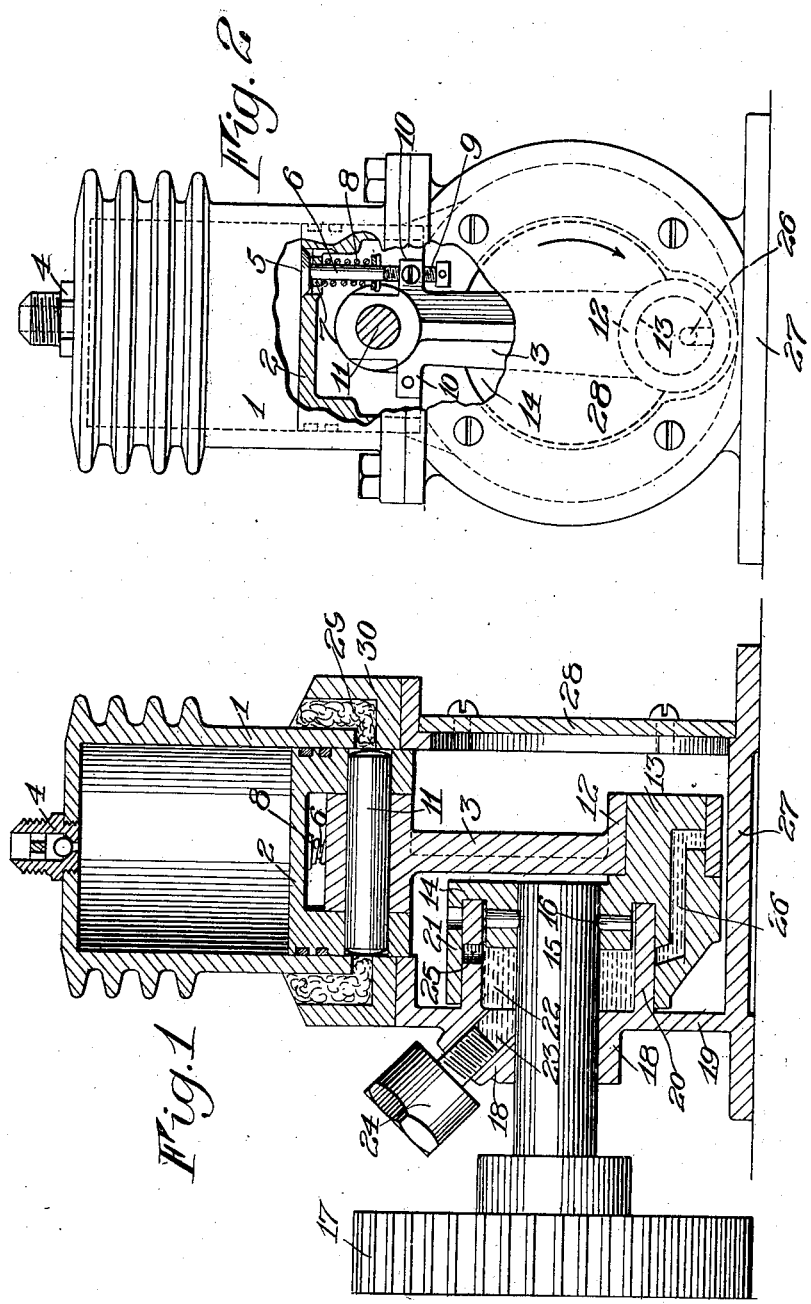

GEORGE W. KELLOGG, OF ROCHESTER, NEW YORK.

PUMP.

1,356,630.  Specification of Letters Patent.  Patented Oct. 26, 1920.

Application filed September 17, 1917. Serial No. 191,716.

*To all whom it may concern:*

Be it known that I, GEORGE W. KELLOGG, of Rochester, in the county of Monroe and State of New York, have invented certain new and useful Improvements in Pumps; and I do hereby declare the following to be a full, clear, and exact description of the same, reference being had to the accompanying drawings, forming a part of this specification, and to the reference characters marked thereon.

My invention has for its purpose to improve the construction of air pumps, more particularly the type of pump employed for inflating pneumatic tires, and one of the specific objects is to provide for efficient lubrication of the parts while preventing access of lubricating fluid to the air line. A further object consists in affording a simple arrangement which can be readily manufactured at a comparatively low cost. To these and other ends the invention resides in certain improvements and combinations of parts all as will be hereinafter more fully described, the novel features being pointed out in the claims at the end of the specification.

In the drawings:

Figure 1 is a vertical sectional view of a pump constructed in accordance with my invention, and Fig. 2 is an end elevation, with parts broken away, and illustrating a portion of the interior, in section.

Similar reference characters throughout the drawings indicate similar parts.

A very common and serious objection to the majority of power pumps intended for pneumatic tire inflating purposes is found in the facility with which oil enters the air line, and is ejected frequently into the tire, or, at best, interferes with the maintaining of a sufficient air pressure. This is due to improper lubrication, that permits an undue quantity of lubricating material to get past the piston and into the air pipe. I overcome this by housing a portion of the driving shaft within an inclosure, that permits of complete lubrication of the driving shaft, as well as the crank connection to the piston rod, without admitting the lubricating liquid in any material amount to the interior of the crank case, or into contact with the piston. I have also provided for lubricating the piston and cylinder sufficiently to insure an easy running operation, while preventing an excess of lubricating material in the cylinder.

The invention may be carried out in various ways, and the structure which I have disclosed is an adequate example of one practical embodiment. In this arrangement, 1 designates the cylinder, and 2 is a reciprocating piston, to which is connected a connecting rod 3. The cylinder is provided with an outlet valve 4, and the piston 2 is provided with an inlet valve disk 5, which latter is mounted upon a valve stem 6. The valve stem 6 travels in the guide 7, and the valve is held normally in closed position by a spring 8. The valve 5 is, on the under side, in contact with the air in the crank case so that if it were not for the inclosed lubrication feed, oil would be liable to splash into the cylinder.

Ordinarily, the suction created is sufficient to open the inlet valve 5 during the down stroke of the piston, but in order to make this operation a positive one, I place an actuator on the connecting rod to engage the valve stem and open the valve. The actuator is preferably in the form of a threaded pin 9, which is adjustable in the lug 10, carried by the connecting rod. There are two such lugs 10 arranged on opposite sides of the connecting rod, so that if the pump is run in the opposite direction, that is run under instead of over the actuator can readily be positioned to coöperate with it, by placing the actuator pin 9 on the left side of the connecting rod, as shown in Fig. 2, and then turning the piston around so that the valve stem will engage the actuator in its new position. It will be apparent that as the piston travels from its uppermost position downwardly, the connecting rod 3 will swing outwardly upon its axis 11, moving the actuator 9 upwardly, and thus opening the valve 5.

The connecting rod 3 carries at its lower end a bearing 12, which receives a crank pin 13 arranged upon the crank disk 14. The latter is fixedly mounted upon the driving shaft 15 by means of pins 16. The driving shaft 15 carries the driving gear 17 and is mounted in a bearing 18, which is carried by the crank case 19. Arranged between the bearing 18 and the crank disk 14, there is provided means for forming a lubricating pocket around the driving shaft 15. To this end, I employ a collar 20, extending from the bearing 18 in spaced relation to the driving shaft 15 and generally in the same direction therewith. I also provide on the crank disk 14, a sleeve 21 arranged in juxtaposition to the collar 20, and preferably engaging the exterior of the latter so that it may act as a bearing for the crank disk if desired. The collar 20 extends preferably to a point in contact with the crank disk 14, and the sleeve 21 preferably extends very nearly to the bearing 18. It will be seen that this construction affords a completely inclosed pocket 22, surrounding the driving shaft 15. The pocket 22 is supplied with lubricating fluid through an opening 23 in the bearing, which is normally closed by a plug 24. 25 is an opening in the collar 20, permitting access of lubricating material to the interior of the sleeve 21, and the said sleeve is provided with an opening 26, which connects the exterior of the collar 20 with the interior of the bearing 12, thereby affording lubrication between the last mentioned bearing and the crank pin 13, which is inclosed, that is inclosed from the space inside the crank case as well as from the outside. Although the drawing shows the lubricant pocket completely inclosed from the outside by the plug 24, it will be understood that the present invention is capable of use without the plug 24 since it is old in the art to do away with a covering for a lubricant pocket. Even without the plug 24, the lubricant pocket is still inclosed inside of the crank case, and is generally inclosed from the exterior, except for a small supply opening.

27 designates the base of the crank case, and 28 is a removable plate which permits access to the interior parts. The cylinder 1 is provided near its bottom with one or more slots or openings 29, which extend upwardly to the exterior through a projecting portion or casting 30 formed upon the cylinder. This affords a recess which receives packing material to hold a lubricating substance. The piston contacts with the lubricating material in recess 29, at the limit of its down stroke and thus the cylinder and piston are constantly lubricated, but no excess of oil can enter the cylinder, or the air line.

Such a structure can be manufactured at a very low cost, and lends itself readily to the operation of a series of pumps from one drive shaft, by intermeshing gearing between a plurality of sleeves 21, only one of which may be driven from the shaft 15.

I claim as my invention:

1. A crank case, a shaft and a bearing therefor in said crank case, an inwardly extending collar on said crank case, concentric to and in spaced relation with said shaft, a crank disk on said shaft, bearing on said collar, a crank pin on said crank disk, the collar being adapted to contain oil for lubrication of the shaft, crank disk, and crank pin, said crank disk and crank pin having a passage therein whereby oil may be supplied to the crank pin.

2. A crank case, a shaft and bearing located in said crank case, a housing for said bearing having a collar thereon, concentric with the shaft spaced therefrom and extending inwardly, a crank disk on the shaft and having a sleeve fitting over said collar whereby an inclosed pocket is formed within said collar and sleeve, between said bearing and crank disk and around said shaft.

3. A crank case, shaft and bearing, a collar on said crank case concentric with the shaft and spaced therefrom adapted to contain a lubricant and extending inwardly, a crank disk on said shaft having a sleeve extending over said collar and rotatable thereon, a crank pin on the crank disk, said collar being perforated to admit lubricant between said collar and sleeve, said crank pin, disk and sleeve having connecting passages therein, whereby lubricant may be supplied to the crank pin.

4. A crank case, shaft, crank pin and coöperating member having a bearing therefor, an inclosed reservoir and passageway for supplying lubricant to the crank pin, which reservoir is accessible from the exterior of the crank case while the reservoir and passageway are inclosed inside the crank case to prevent the free access of the lubricant to the bottom of said crank case.

5. The combination with a shaft, of a bearing therefor, a crank disk on said shaft and a collar projecting from said bearing toward said crank disk spaced from said shaft and in coöperation with said crank disk to form an inclosed lubricant pocket within said collar and between said bearing and crank disk.

6. The combination with a shaft, of a bearing therefor, a crank disk on said shaft, a collar projecting from said bearing toward said crank disk and spaced from the shaft, a sleeve on said crank disk also spaced from the shaft and in coöperation with said collar to form an inclosed lubricant pocket, a crank pin on said crank disk and inclosed passageways within the crank disk and crank pin leading from said pocket and adapted to supply lubricant to said crank pin.

7. The combination with a shaft, of a bearing therefor, a crank disk on said shaft, a sleeve projecting from said crank disk toward said bearing and spaced about said shaft and in coöperation with said bearing to form an inclosed lubricant pocket within said sleeve, contiguous to said shaft and between the bearing and crank disk.

8. In combination with a shaft a bearing member therefor rotatable relative to said shaft, a flange on said shaft fixed relative thereto and spaced from said bearing member and a sleeve on said flange spaced about said shaft extending toward said bearing member, a collar on said bearing member spaced about the shaft, extending toward the flange and in coöperation with said sleeve to form a bearing therefor, and to form an inclosed lubricant pocket within said sleeve and collar around said shaft and between the flange and bearing member.

GEORGE W. KELLOGG.